(12) United States Patent
Krishna

(10) Patent No.: US 10,146,774 B2
(45) Date of Patent: Dec. 4, 2018

(54) CONTENT AUGMENTATION BASED ON A CONTENT COLLECTION'S MEMBERSHIP

(71) Applicant: Vikas Krishna, San Jose, CA (US)

(72) Inventor: Vikas Krishna, San Jose, CA (US)

(73) Assignee: CA, Inc., New York, NY (US)

( * ) Notice: Subject to any disclaimer, the term of this patent is extended or adjusted under 35 U.S.C. 154(b) by 1056 days.

(21) Appl. No.: 14/249,779

(22) Filed: Apr. 10, 2014

(65) Prior Publication Data

US 2015/0293913 A1 Oct. 15, 2015

(51) Int. Cl.
*G06F 17/30* (2006.01)

(52) U.S. Cl.
CPC .. *G06F 17/30011* (2013.01); *G06F 17/30707* (2013.01)

(58) Field of Classification Search
CPC ......... G06F 17/30598; G06F 17/30604; G06F 17/30705; G06F 17/30864; G06F 17/30011; G06F 17/30707
USPC .......................................................... 707/738
See application file for complete search history.

(56) References Cited

U.S. PATENT DOCUMENTS

| | | | |
|---|---|---|---|
| 7,039,856 B2 * | 5/2006 | Peairs | G06F 17/30253 706/15 |
| 2006/0005113 A1 * | 1/2006 | Baluja | G06F 17/30873 715/207 |
| 2006/0023585 A1 * | 2/2006 | Takahashi | G11B 27/329 369/47.1 |
| 2008/0104506 A1 * | 5/2008 | Farzindar | G06F 17/30719 715/254 |
| 2010/0228715 A1 * | 9/2010 | Lawrence | G06F 17/30867 707/740 |
| 2010/0293105 A1 * | 11/2010 | Blinn | G06Q 10/10 705/319 |
| 2011/0055718 A1 * | 3/2011 | Tanaka | G06F 17/30011 715/747 |
| 2012/0284275 A1 * | 11/2012 | Vadrevu | G06F 17/30864 707/738 |
| 2012/0303623 A1 * | 11/2012 | Punera | G06F 17/3071 707/738 |
| 2013/0198193 A1 * | 8/2013 | Chitiveli | G06F 17/30707 707/740 |
| 2014/0006406 A1 * | 1/2014 | Kafati | G06F 17/3071 707/738 |
| 2015/0032813 A1 * | 1/2015 | Doshi | H04L 65/403 709/204 |

* cited by examiner

*Primary Examiner* — James Trujillo
*Assistant Examiner* — Jessica N Le
(74) *Attorney, Agent, or Firm* — Baker Botts L.L.P.

(57) ABSTRACT

A method may include selecting a document from a user's corpus, analyzing content of the selected document, and determining a target content group based on the content of the selected document. The method may further include locating a relevant document based on the determined target content group, and presenting the relevant document to the user. In particular, the target content group may be selected form a plurality of predetermined content groups, wherein the predetermined content groups are automatically generated based on clustering of documents of a content group into subgroups that are similar to each other.

13 Claims, 3 Drawing Sheets

CONTENT AUGMENTATION BASED ON A CONTENT COLLECTION'S MEMBERSHIP

BACKGROUND

The disclosure relates generally to recommending content to a user, and more specifically, to a system and method for augmenting a user's content collection by providing additional content for a target content group based on the user's existing content group.

SUMMARY

According to one embodiment of the disclosure, a method may include selecting a document from a user's corpus, analyzing content of the selected document, and determining a target content group based on the content of the selected document. The method may further include selecting a relevant document based on the determined target content group, and presenting the relevant document to the user. In particular, the target content group may be selected form a plurality of predetermined sub-content groups, wherein the predetermined sub-content groups are automatically generated based on clustering of documents of a content group into subgroups that are similar to each other. The clustering of documents into a subgroup has an advantage of providing finer categorization, especially in a case of a very large content group which may result in false positives when categorizing. Moreover, a feedback mechanism may be provided to the user, wherein the feedback mechanism comprises requesting information from the user regarding the relevance (e.g., the accuracy of relevance) of the relevant document provided to the user, and updating a categorization score associated with the document based on the information from the user.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
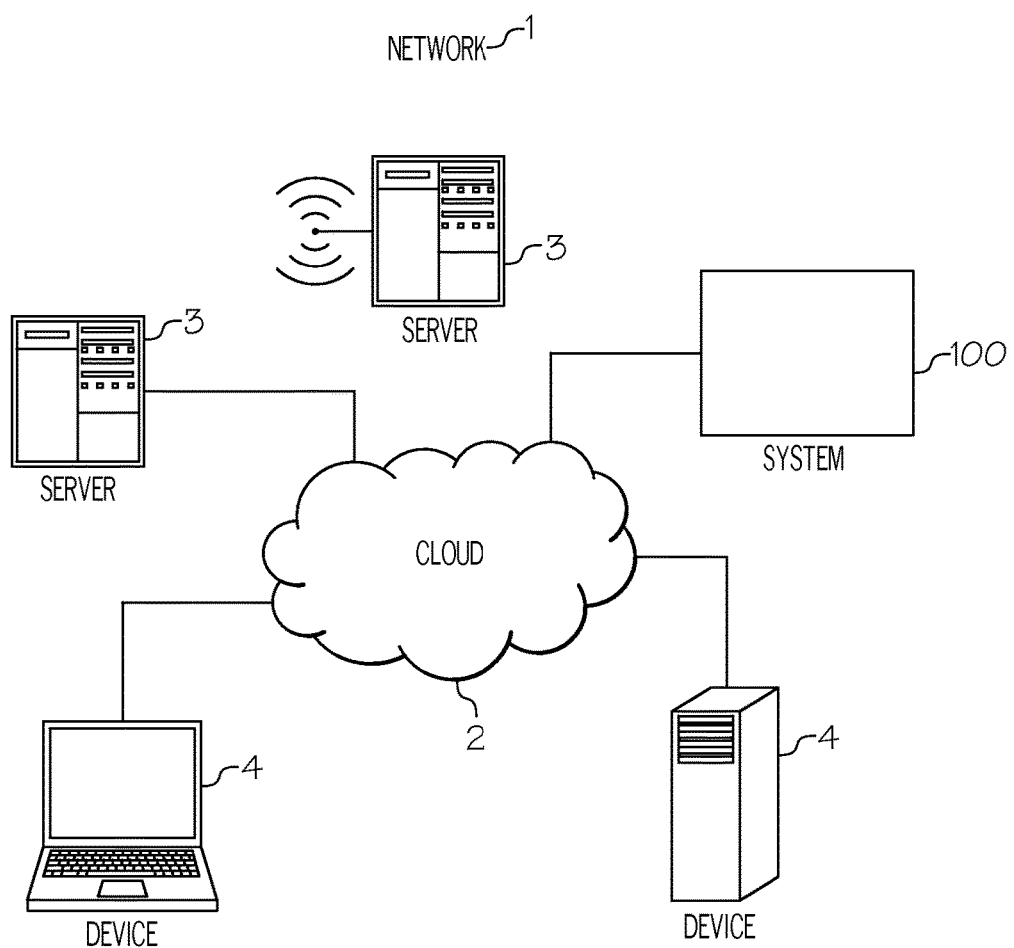
FIG. 1 illustrates a block diagram of a network for a user to access a content group augmentation module, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to FIG. 1, a network 1 allows a user to access and use a content group augmentation module for cloud-based services. The cloud-based services may be internally provided or sourced through third parties. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to could 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide a collaborator recommendation module. System 100 may be, for example, one or more of a general purpose computing device, a specialized computing device, a wired device, a wireless device, a mainframe device, an infrastructure device, a monitoring device, and any other device configured to provide a service reservation module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, document content information, categories of skills information, and other information provided by service providers and users. By collecting the available information from network 1, cloud 2, servers 3, devices 4, and other devices connected to cloud 2, system 100 may perform one or more tasks associated with using the collaborator recommendation module, which is discussed in more detail below. In some configurations, one or more of servers 3 and devices 4 may comprise system 100. In other configurations, system 100 may be separate from servers 3 and devices 4.

Today, knowledge workers often need to group content on their mobile devices, e.g., for specific purposes such as an upcoming meeting. Typically, a worker users his knowledge of what is available in their entire corpus (e.g., all repositories and documents associated with the user) to find related documents, finds these related documents by visiting different document repositories, and then manually adds them to a content group (e.g., a predetermined folder that holds a selection of documents). However, this process can be laborious as well as incomplete because the corpus accessible to the user may be potentially very large and difficult to sift through in a reasonable amount of time. Moreover, the user may not have the time or energy to search through his entire corpus to find all documents that may be potentially useful. Thus, this situation may result in related content that may benefit the user in his given purpose (e.g., his upcoming meeting) being left out of consideration and/or consumption.

The teachings of the present disclosure may provide a content group augmentation module that enables a user to quickly find related content (e.g., related documents), without missing any potentially relevant content, by automatically determining additional content for a target content group based on the content group's existing membership of documents. In particular, the content group augmentation module can allow a user to get started with content group creation in the limited time he has available (e.g., the user can get started by placing a document, or a plurality of documents, in a particular location such as a folder), and then can rely on the content group augmentation module that may be accessed via a central system (e.g., a content management system made available by CA Technologies, see www.ca.com) to augment the content group with additional content by automatically accessing and sifting through all of the user's accessible corpus of documents, and then automatically adding related content to the user's created content group (e.g., the user-created folder of initially selected document(s)). Once this related content is added to the user's created content group, the module may tag the filename of the related content so that the user will easily recognize which documents have been added by the module. These documents may include word processing generated documents, web pages, pdfs, emails, database/store records, software code management or revision stores, wiki entries, stored photograph images and any other types of electronic data that a user would like to store in order to view or otherwise access in the future.

Figure 2:
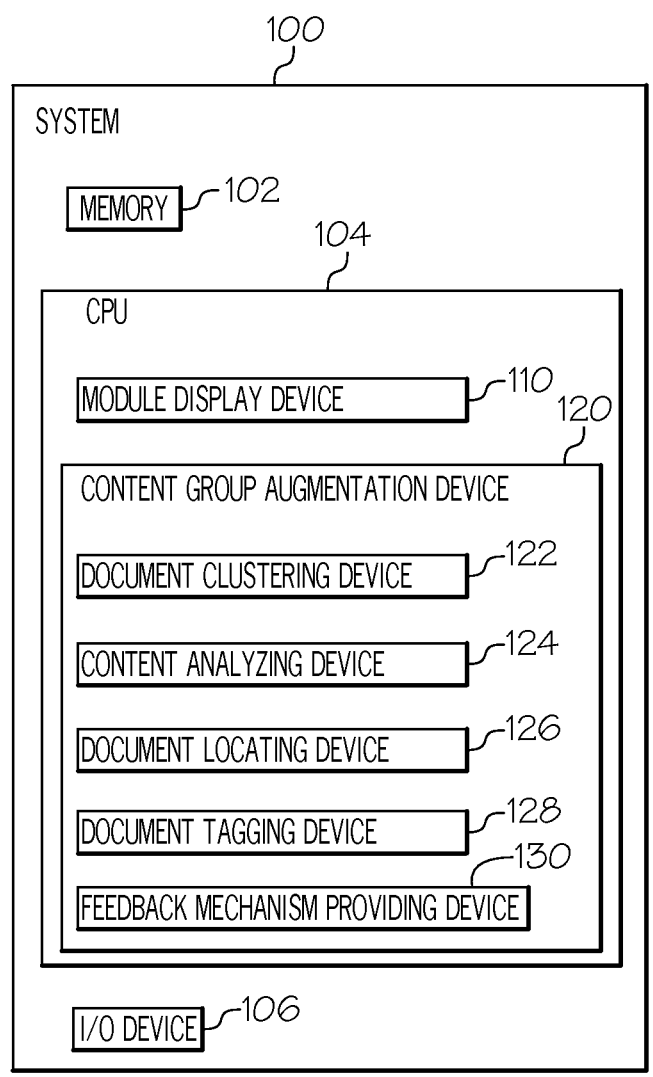
FIG. 2 illustrates a block diagram of a system for determining additional content for a target content group based on the content groups existing membership of documents, in accordance with a particular embodiment of the present disclosure.

Referring now to FIG. 2, system 100, which provides a content group augmentation module, is now described. System 100 may reside on one or more networks 1. System 100 may comprise a memory 102, a central processing unit ("CPU") 104, and an input and output ("I/O") device 106.

Memory 102 may store computer-readable instructions that may instruct system 100 to perform certain processes. As discussed above, memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as one or more of a module display device 110 and a content group augmentation device 120. Content group augmentation device 120 may comprise a document clustering device 122, a content analyzing device 124, a document locating device 126, a document tagging device 128, and a feedback mechanism providing device 130.

I/O device 106 may receive data from networks 1, data from other devices connected to system 100, and/or input from a user and provide such information to CPU 104. I/O device 106 may transmit data to networks 1, may transmit data to other devices connected to system 100, and may transmit information to a user (e.g., display the information via a display device). Further, I/O device 106 may implement one or more of wireless and wired communication between system 100 and other devices.

Figure 3:
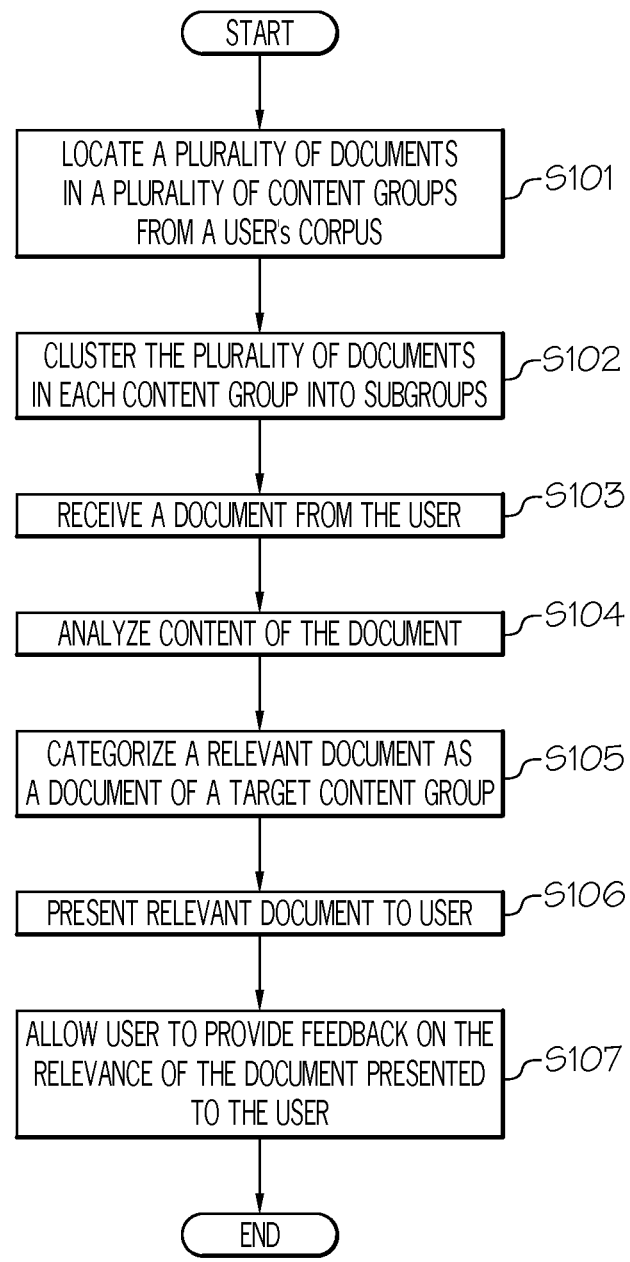
FIG. 3 illustrates a flow chart of a method for determining additional content for the target content group, in accordance with a particular embodiment of the present disclosure.

Referring now to FIG. 3, processes performed by module display device 110 and content group augmentation device 120 are now described. FIG. 3 illustrates a method of determining additional content for a target content group (e.g., a selected document, or a group of selected documents, placed into a folder or other suitable location) based on the content group's existing membership of document(s). In S101, content group augmentation device 120 locates a plurality of documents in a plurality of content groups from a user's corpus. Then, in S102, content group augmentation device 120, operating as a document clustering device 122, clusters the plurality of documents in each content group into subgroups (e.g., clusters of document) that are similar to each other. For example, a content group called "Human Resources document" may include clusters/subgroups of "employee wellness documents," "employee on-boarding documents," "personnel information document," etc. The subgroups/clusters of documents may be selected from a plurality of predetermined subgroups/clusters or content groups (e.g., groups organized based on the content of the included documents). In addition, the plurality of predetermined subgroups/clusters/content groups may be automatically generated based on clustering of documents of a content group into subgroups/clusters that are similar to each other.

In S103, content group augmentation device 120 receives a document from the user. For example, content group augmentation device 120 may be automatically alerted by a system (e.g., a content management system) that the user has place a document or documents into a location (e.g., a folder), and that the document or documents form a content group for which content group augmentation device 120 may provide additional content. Alternatively, or in conjunction, the user may actively alert the content management system to provide additional content (e.g., relevant document) based on a document or documents the user has placed in a location/folder. Then, in S104, content group augmentation device 120, operating as a content analyzing device 124, may analyze the content of the selected document received from the user so as to determine, for example, what subgroup/cluster of documents is most relevant to the content within the selected document.

In S105, content group augmentation device 120, operating as a document locating device 126, may locate and categorize a relevant document (i.e., a document located in a user's corpus that is relevant to the selected document) as a document of a target content group (e.g., based on the analysis of the content of the selected document) of a plurality of available content groups. For example, document locating device 128 may locate a plurality of documents accessible to the user, which may include the user's entire corpus, or all repositories and documents associated with the user. The plurality of documents may also include public documents not specifically associated with the user, but that the user may have access to. In particular, document locating device 126 may take each document accessible to the user, in various repositories, and assign a relevance score (i.e., categorization score) to each document based on the content of the document. Then, document locating device 126 may select a relevant document or documents from the plurality of documents based on a determination by the document locating device 126 that the relevance score of the document or documents is greater or equal to a predetermined threshold. For example, the predetermined threshold may be set by an administrator or other suitable entity, and has purpose of separating relevant documents from non-relevant documents and avoiding pulling every document accessible to the user into the target content group.

Then, in S106, content group augmentation device 120, operating through I/O device 106, may present the relevant documents to the user. These relevant documents may be presented automatically to the user. For example, content group augmentation device 120 may populate the folder or location in which the user originally placed documents into with the relevant document or documents. In addition, content group augmentation device 120 may differentiate these relevant document or documents placed into the folder by the content management system by "tagging" these documents, e.g., by tagging the file name of the newly-added relevant documents. As an example, content group augmentation device 120, operating as a document tagging device 128, may tag the file name by adding "automatically added by content management system" to the file name of the relevant documents. After content group augmentation device 120 presents the relevant documents to the user, the process may terminate. As discussed above, this content group augmentation system has the advantage of automatically determining additional content for a target content group based on a user-selected content group's existing membership of documents, thus providing a robust system that can quickly and automatically augment a user-selected group of documents with additional relevant documents.

Then, in S107, content group augmentation device 120, operating as a feedback mechanism providing device 132, and via a module display device 110, may request information from the user regarding the relevance of the relevant document or documents provided to the user. This additional functionality of providing a feedback mechanism to the user may further train the system on the accuracy of the system-determined relevance of the documents that were automatically added to the user-selected group of documents, if the user chooses to do so. In particular, feedback mechanism providing device 130 may, for example, ask the user a simple "YES/NO" question about whether the user found the system-determined relevant documents to be relevant to the user-selected group of documents, or may request any other suitable information that can be processed by the document management system. Then, content group augmentation device 120, may update the relevance score of the system-determined relevant document provided to the user based on the information received from the user. This additional functionality has the advantage of providing a feedback mechanism by which the system may more accurately and intelligently determine the relevance of documents based on information provided by the user.

The block diagrams and flowcharts in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
receiving, from a user, an identification of a folder including a plurality of documents selected by the user, from a user's corpus;
analyzing content of the selected documents;
determining a plurality of content groups of documents from a plurality of repositories associated with the user based on text of each document, wherein each content group contains documents having similar content as categorized by the text of each document;
determining a target content group, from the plurality of content groups, based on the content of the selected documents, the target content group comprising documents from the plurality of repositories associated with the user;
searching the plurality of repositories associated with the user to identify additional content, within the target content group, related to the content of the selected documents;
storing the additional content in the folder;
locating a relevant document based on the additional content related to the content of the selected documents;
presenting the relevant document to the user: and
wherein the target content group is selected from a plurality of predetermined sub-content groups that are automatically generated based on clustering of documents of a content group into subgroups that are similar to each other.

2. The method of claim 1, wherein the step of locating a relevant document comprises:
determining a categorization score of each of a plurality of documents of the user's corpus into the predetermined sub-content groups, and
selecting the relevant document from the plurality of documents based on a determination that the categorization score of the document is greater or equal to a predetermined threshold.

3. The method of claim 1, wherein the step of presenting the relevant document to the user comprises automatically tagging a file name of the relevant document with a predetermined identifier.

4. The method of claim 1, further comprising:
providing a feedback mechanism to the user,
wherein the feedback mechanism comprises:
requesting information from the user regarding the relevance of the relevant document provided to the user, and
updating a categorization score associated with the document based on the information from the user.

5. A system comprising:
an identification device configured to identify a folder including a plurality of documents selected by a user, from a user's corpus;
an analyzing device configured to analyze content of the selected documents;
a determining device configured to:
determine a plurality of content groups of documents from a plurality of repositories associated with the user based on text of each document, wherein each content group contains documents having similar content as categorized by the text of each document; and determine a target content group, from the plurality of content groups, based on the content of the selected documents, the target content group comprising documents from the plurality of repositories associated with the user;

a searching device configured to search the plurality of repositories associated with the user to identify additional content, within the target content group, related to the content of the selected documents;

a memory for storing the additional content in the folder;

a locating device configured to locate a relevant document based on the additional content related to the content of the selected documents;

a presenting device configured to present the relevant document to the user; and wherein the locating device is further configured to:
determine a categorization score of each of a plurality of documents of the user's corpus, and
select the relevant document from the plurality of documents based on a determination that the categorization score of the document is greater or equal to a predetermined threshold.

6. The system of claim 5, wherein the target content group is selected from a plurality of predetermined sub-content groups.

7. The system of claim 6, wherein the plurality of predetermined sub-content groups are automatically generated based on clustering of documents of a content group into subgroups that are similar to each other.

8. The system of claim 5, wherein the presenting device is further configured to automatically tag a file name of the relevant document with a predetermined identifier.

9. The system of claim 5, further comprising:
a feedback device configured to provide a feedback mechanism to the user,
wherein the feedback mechanism comprises:
a requesting device configured to request information from the user regarding the relevance of the relevant document provided to the user, and
an updating device configured to update a categorization score associated with the document based on the information from the user.

10. A computer program product comprising:
a computer-readable storage medium having computer-readable program code embodied therewith, the computer-readable program code comprising:
computer readable program code configured to receive an identification of a folder including a plurality of documents selected by a user;
computer readable program code configured to analyze content of the selected documents;
computer readable program code configured to determine a plurality of content groups of documents from a plurality of repositories associated with the user based on text of each document, wherein each content group contains documents having similar content as categorized by the text of each document;
computer readable program code configured to determine a target content group, from the plurality of content groups, based on the content of the selected documents, the target content group comprising documents from the plurality of repositories associated with the user;
computer readable program code configured to search the plurality of repositories associated with the user to identify additional content, within the target content group, related to the content of the selected documents;
computer readable program code configured to store the additional content in the folder;
computer readable program code configured to locate a relevant document based on the additional content related to the content of the selected documents;
computer readable program code configured to present the relevant document to the user; and
wherein the target content group is selected from a plurality of predetermined sub-content groups that are automatically generated based on clustering of documents of a content group into subgroups that are similar to each other.

11. The computer program product of claim 10, wherein the computer readable program code configured to locate the relevant document is further configured to:
determine a categorization score of each of a plurality of documents of the user's corpus, and
select the relevant document from the plurality of documents based on a determination that the categorization score of the document is greater or equal to a predetermined threshold.

12. The computer program product of claim 10, wherein the computer readable program code configured to present the relevant document to the user is further configured to automatically tag a file name of the relevant document with a predetermined identifier.

13. The computer program product of claim 10, wherein the computer-readable program code further comprises:
computer-readable program code configured to provide a feedback mechanism to the user,
wherein the feedback mechanism comprises:
computer-readable program code configured to request information from the user regarding the relevance of the relevant document provided to the user, and
computer-readable program code configured to update a categorization score associated with the document based on the information from the user.

* * * * *